(12) United States Patent
Clarke et al.

(10) Patent No.: US 12,221,246 B2
(45) Date of Patent: Feb. 11, 2025

(54) TRAY AND MANUFACTURE THEREOF

(71) Applicant: Bockatech Ltd., Cambridgeshire (GB)

(72) Inventors: Peter Reginald Clarke, Cambridgeshire (GB); Chris Bocking, Cambridgeshire (GB)

(73) Assignee: Bockatech Ltd., Cambridgeshire (GB)

( * ) Notice: Subject to any disclaimer, the term of this patent is extended or adjusted under 35 U.S.C. 154(b) by 22 days.

(21) Appl. No.: 17/928,648

(22) PCT Filed: Jul. 16, 2021

(86) PCT No.: PCT/EP2021/070035
§ 371 (c)(1),
(2) Date: Nov. 30, 2022

(87) PCT Pub. No.: WO2022/017986
PCT Pub. Date: Jan. 27, 2022

(65) Prior Publication Data
US 2023/0227199 A1    Jul. 20, 2023

(30) Foreign Application Priority Data

| Jul. 22, 2020 | (GB) | 2011345 |
| Nov. 11, 2020 | (GB) | 2017812 |
| Nov. 11, 2020 | (GB) | 2017813 |

(51) Int. Cl.
*B65D 1/34* (2006.01)
*B29C 33/00* (2006.01)
(Continued)

(52) U.S. Cl.
CPC .......... *B65D 1/34* (2013.01); *B29C 33/0033* (2013.01); *B29C 44/18* (2013.01);
(Continued)

(58) Field of Classification Search
CPC . B65D 1/34; B65D 1/40; B65D 1/265; B65D 1/28; B65D 1/36; B65D 1/42;
(Continued)

(56) References Cited

U.S. PATENT DOCUMENTS 3,209,978 A * 10/1965 Dupuis ............... B65D 1/34
426/127
3,450,326 A   6/1969 Foote
(Continued)

FOREIGN PATENT DOCUMENTS

| FR | 2110309 A1 | 6/1972 |
| GB | 1181604    | 2/1970 |

(Continued)

OTHER PUBLICATIONS

Combined Search and Examination Report Under Sections 17 and 18(3) in related GB application 2011345.2 issued on Jan. 13, 2021.
(Continued)

*Primary Examiner* — Rafael A Ortiz
(74) *Attorney, Agent, or Firm* — Polsinelli, P.C.

(57) ABSTRACT

A tray having: an annular sidewall having upper and lower annular peripheral edges, an upper annular peripheral rim which is integral with the upper annular peripheral edge, and a base having an annular peripheral edge which is integral with the lower annular peripheral edge of the sidewall, wherein the rim, the sidewall and the base are composed of a thermoplastic polymer and the sidewall and the base define a central concavity for packaging a product, wherein the base has a lattice structure of elongate foam ribs interconnected by foam junctions, wherein each foam rib has opposite ends, and each end is integrally connected to either the annular peripheral edge of the base or one of the foam junctions, wherein each foam rib and each foam junction has opposed upper and lower unfoamed solid skins of the
(Continued)

thermoplastic polymer on opposite sides of a central cellular foam core of the thermoplastic polymer.

22 Claims, 9 Drawing Sheets

(51) Int. Cl.
| | |
|---|---|
| B29C 44/18 | (2006.01) |
| B29C 44/42 | (2006.01) |
| B29C 44/58 | (2006.01) |
| B29C 45/00 | (2006.01) |
| B29C 45/14 | (2006.01) |
| B29C 45/17 | (2006.01) |
| B29C 45/37 | (2006.01) |
| B29K 101/12 | (2006.01) |
| B65D 1/26 | (2006.01) |
| B65D 1/36 | (2006.01) |
| B65D 1/40 | (2006.01) |
| B65D 1/42 | (2006.01) |
| B65D 5/20 | (2006.01) |
| B65D 5/66 | (2006.01) |
| B65D 65/46 | (2006.01) |
| B29K 105/04 | (2006.01) |
| B29L 31/00 | (2006.01) |

(52) U.S. Cl.
CPC .... *B29C 45/0081* (2013.01); *B29C 45/14336* (2013.01); *B29C 45/1704* (2013.01); *B29C 45/1706* (2013.01); *B29C 45/37* (2013.01); *B65D 1/265* (2013.01); *B65D 1/36* (2013.01); *B65D 1/40* (2013.01); *B65D 1/42* (2013.01); *B65D 5/2038* (2013.01); *B65D 5/66* (2013.01); *B65D 65/466* (2013.01); *B29C 44/428* (2013.01); *B29C 44/583* (2013.01); *B29K 2101/12* (2013.01); *B29K 2105/04* (2013.01); *B29L 2031/712* (2013.01); *B29L 2031/7132* (2013.01); *B29L 2031/737* (2013.01)

(58) Field of Classification Search
CPC ................ B29C 44/18; B29C 45/0081; B29C 45/14336; B29C 44/428; B29K 2105/04; B29K 2105/043
USPC ........................................................ 206/557
See application file for complete search history.

(56) References Cited

U.S. PATENT DOCUMENTS

| | | | |
|---|---|---|---|
| 3,489,270 A * | 1/1970 | Schelmetic | .......... B65D 85/324 225/2 |
| 3,727,791 A | 4/1973 | Fraser et al. | |
| 4,195,746 A | 4/1980 | Cottrell | |
| 4,349,146 A | 9/1982 | Holden | |
| 4,533,585 A | 8/1985 | Holden | |
| 2013/0015096 A1 * | 1/2013 | BeVier | ..................... B65D 1/42 220/675 |

FOREIGN PATENT DOCUMENTS

| | | | | |
|---|---|---|---|---|
| WO | 2017134181 A1 | 8/2017 | | |
| WO | WO-2019025274 A1 * | 2/2019 | ............. | B29C 44/04 |

OTHER PUBLICATIONS

International Search Report and Written Opinion in related international application PCT/EP2021/070035 issued on Nov. 23, 2021.
"Selective Foaming Makes Parts Strong and Lightweight", Modern Plastics International, McGraw-Hill, Inc., Lausanne, CH, vol. 26, No. 10, Oct. 1, 1996.
International Preliminary Report on Patentability in related international application PCT/EP2021/070035 issued on Jan. 24, 2023.
Communication under Rule 71(3) EPC in related EP Application 21742434.0 issued on Apr. 4, 2024.

* cited by examiner

A - A

A - A

A - A

A - A

TRAY AND MANUFACTURE THEREOF

FIELD OF THE INVENTION

The present invention relates to the manufacture of foamed thermoplastic polymer trays, e.g. trays for food.

BACKGROUND

In the packaging industry, there is a general need to make disposable packaging of recyclable material. Preferably, the packaging is made of a single recyclable material, such as PET or a polyolefin. There is also a general need to reduce the mass of thermoplastic material used for any given packaging article. The reduced mass not only reduces the cost of manufacturing the packaging article, but also reduces the volume of material to be recycled.

Efforts have been made in the industry to provide various disposable packaging articles. For example, WO-A-2017/134181, WO-A-2019/025274 and WO-A-2020/048912 disclose the manufacture of a lightweight polypropylene cup which has expanded regions comprising a cellular foam.

SUMMARY OF THE INVENTION

However, despite this prior art disclosure there is still a need to produce foamed plastic articles, in particular trays for foodstuffs, which have even smaller wall thickness and even lower mass, yet high stiffness, as well as low cost. The tray is required to have a desired precise geometrical shape, yet nevertheless have high wall strength, and preferably is composed of a single recyclable material.

The present invention aims at least partially to overcome the problem of achieving even smaller wall thickness and even lower mass, a desired precise geometrical shape, yet nevertheless high stiffness and wall strength, in articles composed of a single recyclable material.

According to one embodiment, a tray is provided comprising:
- an annular sidewall having upper and lower annular peripheral edges, an upper annular peripheral rim which is integral with the upper annular peripheral edge, and a base which comprises an annular peripheral edge which is integral with the lower annular peripheral edge of the sidewall, wherein the rim, the sidewall and the base are composed of a thermoplastic polymer and the sidewall and the base define a central concavity for packaging a product, wherein the base comprises a lattice structure of elongate foam ribs interconnected by foam junctions, wherein each foam rib has opposite ends, and each end is integrally connected to either the annular peripheral edge of the base or one of the foam junctions, wherein each foam rib and each foam junction comprise opposed upper and lower unfoamed solid skins of the thermoplastic polymer on opposite sides of a central cellular foam core of the thermoplastic polymer.

According to one embodiment, the foam junctions comprise at least one primary foam junction, wherein each primary foam junction comprises an annular foam joint having outer and inner peripheral edges, wherein the foam joint comprises opposed upper and lower unfoamed solid skins of the thermoplastic polymer on opposite sides of a central cellular foam core of the thermoplastic polymer, a plurality of the ends of respective foam ribs intersect with the outer peripheral edge of the foam joint, and the inner peripheral edge of the foam joint circumferentially surrounds a central area of unfoamed thermoplastic polymer.

According to one embodiment, the base comprises a primary foam junction at a centre of the base, optionally wherein the primary foam junction at the centre of the base is aligned with an injection moulding sprue in the base.

According to one embodiment, the foam junctions comprise at least one second foam junction, wherein each second foam junction comprises a plurality of the ends of respective foam ribs, wherein the ends intersect and surround a central region of unfoamed thermoplastic polymer.

According to one embodiment, the base comprises a plurality of the second foam junctions which surround, and are spaced from, a centre of the base.

According to one embodiment, the base comprises an injection moulding sprue which comprises unfoamed thermoplastic polymer and is circumferentially surrounded by a region of unfoamed thermoplastic polymer adjacent thereto.

According to one embodiment, the lattice structure is polygonal and lateral spacings between the ribs are polygonal, optionally wherein the lattice structure is rectangular and the lateral spacings between the ribs are rectangular or triangular.

According to one embodiment, the lattice structure is an open framework with a plurality of openings, each opening being surrounded by a plurality of the elongate foam ribs, or by at least one of the elongate foam ribs and a portion of the lower annular peripheral edge, and wherein the base further comprises a flexible sheet which is bonded to the lattice structure and to the annular peripheral edge of the base to cover the openings and form a sealed base surface of the tray.

According to one embodiment, the flexible sheet is bonded to a lower surface of the lattice structure and to a lower surface of the annular peripheral edge of the base.

According to one embodiment, the flexible sheet is additionally bonded to an outer peripheral surface of the sidewall which surrounds the base of the tray.

According to one embodiment, the flexible sheet is bonded to an upper surface of the lattice structure and to an upper surface of the annular peripheral edge of the base.

According to one embodiment, each opening is covered by a respective portion of the flexible sheet, each portion being slack and thereby not under tension.

According to one embodiment, the flexible sheet has an outer peripheral edge which is sealed within the thickness of the sidewall or base.

According to one embodiment, the outer peripheral edge of the flexible sheet is sealed within a central cellular foam core of the sidewall or base.

According to one embodiment, the flexible sheet is composed of an unfoamed thermoplastic polymer comprising a single polymer layer or a multilayer laminate, or the sheet is composed of a foamed thermoplastic polymer comprising opposed unfoamed solid skins of the thermoplastic polymer on opposite sides of a central cellular foam core of the thermoplastic polymer.

According to one embodiment, at least one or both of an outer surface and an inner surface of the sheet is printed whereby the sheet functions as a label.

According to one embodiment, the base further comprises a base wall of unfoamed thermoplastic polymer which fills lateral spacings between the ribs and is integral with the lattice structure to form a continuous base surface of the tray.

According to one embodiment, an upper surface of the base wall is aligned with an upper surface of the upper unfoamed solid skins of the foam ribs and foam junctions.

According to one embodiment, in each foam rib one or both of the opposed upper and lower unfoamed solid skins of the thermoplastic polymer comprises a convexly curved surface.

According to one embodiment, the convexly curved surface is continuously convexly curved between opposite elongate longitudinal edges of the elongate foam rib.

According to one embodiment, the annular peripheral edge of the base consists of unfoamed thermoplastic polymer.

According to one embodiment, the annular sidewall consists of unfoamed thermoplastic polymer.

According to one embodiment, the annular sidewall comprises at least one annular foam hoop reinforcement integral with the annular sidewall, wherein the foam hoop reinforcement comprises opposed unfoamed solid skins of the thermoplastic polymer on opposite sides of a central cellular foam core of the thermoplastic polymer.

According to one embodiment, the upper annular peripheral rim consists of unfoamed thermoplastic polymer.

According to one embodiment, the upper annular peripheral rim comprises an annular flange of unfoamed thermoplastic polymer reinforced by an integral annular foam hoop reinforcement, wherein the foam hoop reinforcement comprises opposed unfoamed solid skins of the thermoplastic polymer on opposite sides of a central cellular foam core of the thermoplastic polymer.

According to one embodiment, a method of forming a tray is provided comprising:

(a) providing a mould having a first mould part and a second mould part, the first and second mould parts having respective first and second cavity-forming surfaces, wherein the first and second cavity-forming surfaces have respective first and second regions for moulding a base of a tray;

(b) closing the mould thereby defining a cavity between the first and second cavity-forming surfaces, wherein the cavity defines an annular peripheral rim-forming portion, an annular sidewall-forming portion which is adjacent to the rim-forming portion, and a base-forming portion which is adjacent to the sidewall-forming portion, wherein the first region of the first cavity-forming surface comprises a lattice-forming portion comprising a latticed network of concavities in the first cavity-forming surface;

(c) injecting a molten plastic composition comprising a thermoplastic polymer and a physical blowing agent into the cavity, wherein the physical blowing agent is a gas dissolved in the polymer, the molten plastic composition being injected at an injection pressure, wherein during or after the injecting step (c), the injected plastic composition in contact with the first and second cavity-forming surfaces is cooled to form first and second solid skins respectively adjacent to and in contact with the first and second cavity-forming surfaces, whereby in at least the latticed network of concavities is located a lattice-forming part of the plastic composition in which lattice-forming part at least some of the plastic composition between the first and second solid skins remains molten, wherein the lattice-forming part defines a structure of elongate rib-forming parts interconnected by junction-forming parts, wherein each rib-forming part has opposite ends, and each end is integrally connected to either an annular outer peripheral edge-forming part of the base-forming part or one of the junction-forming parts, wherein each rib-forming part and each junction-forming part comprise opposed first and second solid skins on opposite sides of a central core of the molten plastic composition;

(d) opening the mould before the molten plastic composition between the first and second solid skins has solidified in the lattice-forming part, so as to expose the molten plastic composition of the lattice-forming part to an external pressure lower than the injection pressure thereby allowing the molten plastic composition between the first and second solid skins of the lattice-forming part to expand by foaming to form an expanded cellular foam as a result of the molten plastic composition beneath the first solid skin expanding away from the second solid skin, wherein the opening step comprises removing the first mould part so that the first solid skin is no longer in contact with the first cavity-forming surface; and (e) cooling the expanded cellular foam to cause the molten plastic composition between the first and second solid skins of the lattice-forming part to solidify and to form in the base of the tray a lattice structure of elongate foam ribs interconnected by foam junctions, wherein each foam rib has opposite ends, and each end is integrally connected to either an annular peripheral edge of the base or one of the foam junctions, wherein each foam rib and each foam junction comprise opposed upper and lower unfoamed solid skins of the thermoplastic polymer on opposite sides of a central cellular foam core of the thermoplastic polymer.

According to one embodiment, the first and second mould parts are, respectively, outer and inner mould parts which respectively form outer and inner surfaces of the tray, or the first and second mould parts are, respectively, inner and outer mould parts which respectively form inner and outer surfaces of the tray.

According to one embodiment, in step (d) in each foam rib the first solid skin is expanded to form a convexly curved surface.

According to one embodiment, the convexly curved surface is continuously convexly curved between opposite elongate longitudinal edges of the elongate foam rib.

According to one embodiment, the junction-forming part is configured so that, after step (e) the foam junctions comprise at least one primary foam junction, wherein each primary foam junction comprises an annular foam joint having outer and inner peripheral edges, wherein the foam joint comprises opposed upper and lower unfoamed solid skins of the thermoplastic polymer on opposite sides of a central cellular foam core of the thermoplastic polymer, a plurality of the ends of respective foam ribs intersect with the outer peripheral edge of the foam joint, and the inner peripheral edge of the foam joint circumferentially surrounds a central area of unfoamed thermoplastic polymer formed between the first and second cavity-forming surfaces prior to step (d).

According to one embodiment, the base comprises a primary foam junction at a centre of the base, optionally wherein the primary foam junction at the centre of the base is aligned with an injection gate in injecting step (c).

According to one embodiment, the foam junctions comprise at least one second foam junction, wherein each second foam junction comprises a plurality of the ends of respective foam ribs, wherein the ends intersect and surround a central region of unfoamed thermoplastic polymer formed between the first and second cavity-forming surfaces prior to step (d).

According to one embodiment, the base comprises a plurality of the second foam junctions which surround, and are spaced from, a centre of the base.

According to one embodiment, the lattice structure is polygonal and lateral spacings between ribs are polygonal, optionally wherein the lattice structure is rectangular and the lateral spacings are rectangular or triangular.

According to one embodiment, in step (c) the molten plastic composition is injected through an injection moulding sprue in the base-forming portion and the base-forming portion is configured to space the first and second cavity-forming surfaces from each other so that after step (e) the injection moulding sprue comprises unfoamed thermoplastic polymer and is circumferentially surrounded by a region of unfoamed thermoplastic polymer adjacent thereto.

According to one embodiment, in step (b) the first and second cavity-forming surfaces are spaced from each other in the base-forming portion to form a base wall-forming portion of the mould, and in step (c) a solid base wall of unfoamed thermoplastic polymer is formed which fills lateral spacings between the ribs and is integral with the lattice structure to form a continuous base surface of the tray.

According to one embodiment, in step (b) the first and second cavity-forming surfaces are compressed together in the base-forming portion to form an opening-forming portion of the mould, the method further comprises the step, before injecting step (c), of providing an in-mould flexible sheet in the cavity, the in-mould flexible sheet being located adjacent to the lattice-forming portion of the first cavity-forming surface or adjacent to the second cavity-forming surface at a location opposite the lattice-forming portion of the first cavity-forming surface, wherein the in-mould flexible sheet is located in the opening-forming portion of the mould and compressed between the first and second cavity-forming surfaces, and wherein in step (c) the lattice structure is an open framework with a plurality of openings formed by the opening-forming portion of the mould, each opening being surrounded by a plurality of the rib-forming parts, or by at least one of the rib-forming parts and a portion of the annular peripheral edge of the base-forming part, and wherein in step (c) the flexible sheet is bonded to the first or second solid skin of the lattice structure, whereby after step (e) the flexible sheet is bonded to the annular peripheral edge of the base to cover the openings and form a sealed base surface of the tray.

According to one embodiment, prior to step (b) the in-mould flexible sheet is located adjacent to an outer mould part of the first and second mould parts which forms an outer surface of the tray, and after step (e) the flexible sheet is bonded to a lower surface of the lattice structure and to a lower surface of the annular peripheral edge of the base of the tray.

According to one embodiment, the flexible sheet is additionally bonded to a peripheral surface of the sidewall which surrounds the base of the tray.

According to one embodiment, prior to step (b) the in-mould flexible sheet is located adjacent to an inner mould part of the first and second mould parts which forms an inner surface of the tray, and after step (e) the flexible sheet is bonded to an upper surface of the lattice structure and to an upper surface of the annular peripheral edge of the base of the tray.

According to one embodiment, the flexible sheet has an outer peripheral edge which is sealed within the thickness of the sidewall or base, optionally wherein the outer peripheral edge of the flexible sheet is sealed within a central cellular foam core of the sidewall or base.

According to one embodiment, the sheet is composed of an unfoamed thermoplastic polymer comprising a single polymer layer or a multilayer laminate, or the sheet is composed of a foamed thermoplastic polymer comprising opposed unfoamed solid skins of the thermoplastic polymer on opposite sides of a central cellular foam core of the thermoplastic polymer.

According to one embodiment, at least one or both of an outer surface and an inner surface of the sheet is printed, the outer and inner surfaces being with respect to the tray, whereby the sheet functions as a label.

According to one embodiment, during the opening step (d) the first solid skin is exposed to the atmosphere and the external pressure is atmospheric pressure.

BRIEF DESCRIPTION OF THE DRAWINGS

Embodiments of the present invention will now be described by way of example only with reference to the accompanying drawings, in which.

Figure 1:
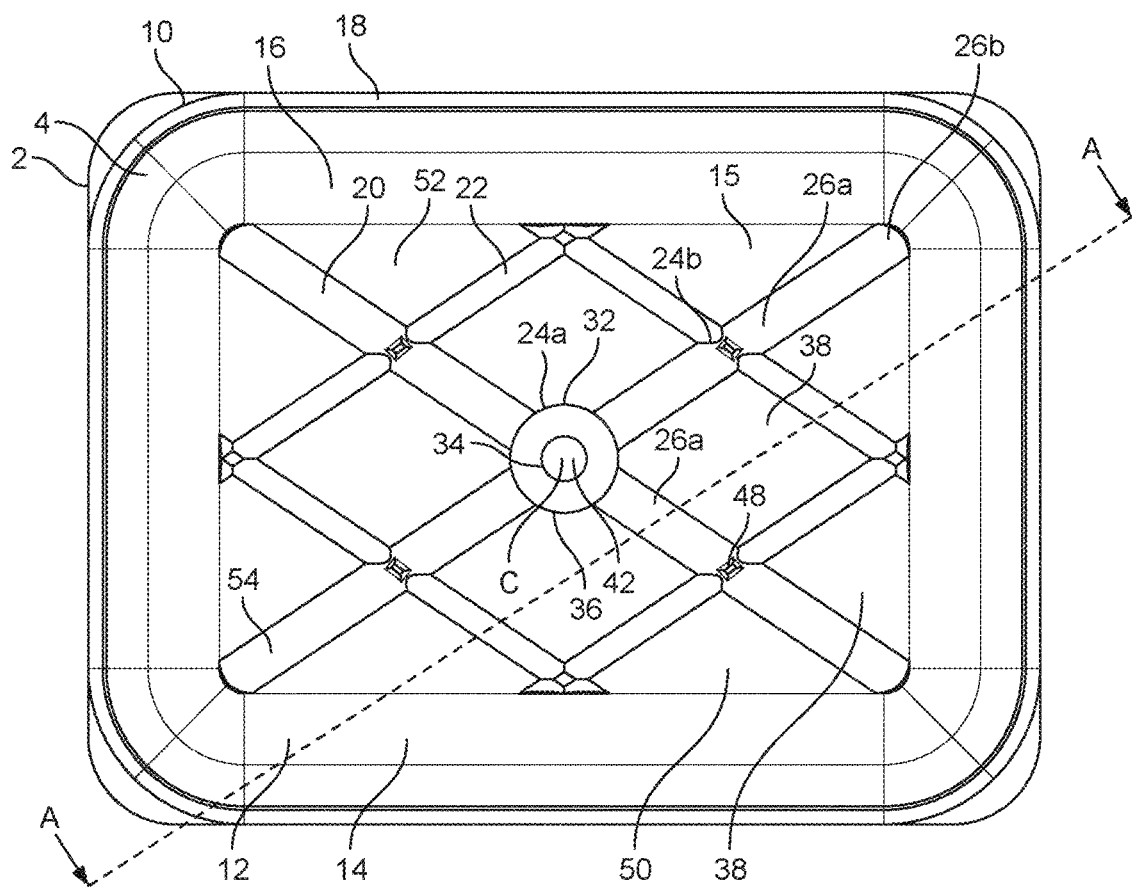
FIG. 1 is a plan view from above of a tray in accordance with a first embodiment of the present invention.
Figure 2:
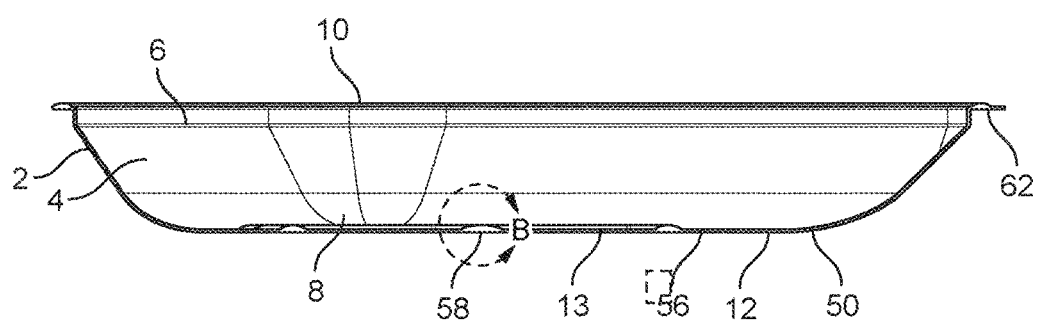
FIG. 2 is a cross-section on line A-A of the tray of FIG. 1.

The drawings are not necessarily to scale, and some dimensions may be exaggerated for the purpose of clarity of illustration.

DETAILED DESCRIPTION

Referring to FIGS. 1 to 4, there is shown a tray in accordance with an embodiment of the present invention.

The tray 2 comprises an annular sidewall 4 having upper and lower annular peripheral edges 6, 8. In this specification, the term "annular" means "generally ring-like", is not limited to geometrically circular shapes, and encompasses shapes that may be circular or other than circular, for example elliptical, polygonal, etc. In the illustrated embodiment, the tray 2 is rectangular in plan, but any other shape, which may be polygonal or rounded, may be used. An upper annular peripheral rim 10 is integral with the upper annular peripheral edge 6. A base 12 comprises an annular peripheral edge 14 which is integral with the lower annular peripheral edge 8 of the sidewall 4.

The rim 10, the sidewall 4 and the base 12 are composed of a thermoplastic polymer.

In the preferred embodiments of the present invention, the thermoplastic polymer may comprise a polyolefin or blend of a plurality of polyolefins, optionally polyethylene or polypropylene; or a polyester, optionally polyethylene terephthalate or polybutylene terephthalate; or polylactic acid. In a particularly preferred embodiment, the polymer comprises polypropylene. Polypropylenes having a Melt Flow Index (MFI) of from 10 to 120 are most particularly preferred. The Melt Flow Index of a polymer can be measured according to ASTM D1238.

The sidewall 4 and the base 12 define a central concavity 16 for packaging a product, such as a foodstuff (not shown). Typically, when packaging a foodstuff a sealing film (not shown) is sealed to the upper surface 18 of the rim 10.

The base 12 comprises a lattice structure 20 of elongate foam ribs 22 interconnected by foam junctions 24a, 24b. Each foam rib 22 has opposite ends 26a, 26b. Each end 26a, 26b is integrally connected to either the annular peripheral edge 14 of the base 12 or one of the foam junctions 24a, 24b.

Figure 3:
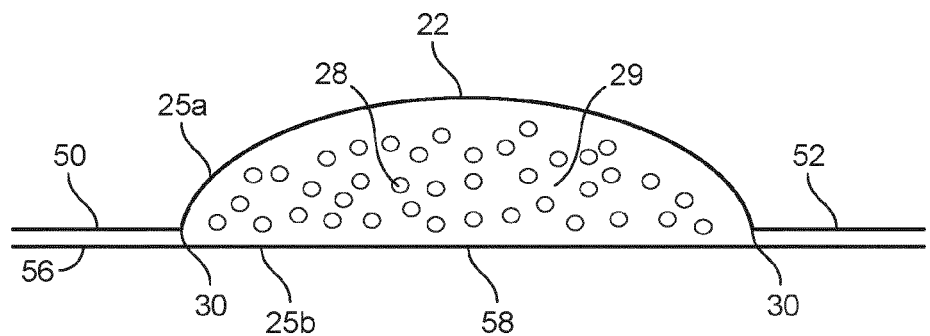
FIG. 3 is an enlarged view of area B of FIG. 2 illustrating in cross-section the structure of a foam rib in an unfoamed base wall of the tray of FIG. 1.

As shown in FIG. 3, each foam rib 22 and each foam junction 24a, 24b comprises opposed upper and lower unfoamed solid skins 25a, 25b of the thermoplastic polymer on opposite sides of a central cellular foam core 28 composed of an expanded cellular foam 29 of the thermoplastic polymer.

Each foam rib 22 comprises a convex solid skin which is preferably continuously convexly curved between opposite elongate longitudinal edges 30 of the elongate foam rib 22. The convex solid skin may comprise either or both of the upper and lower unfoamed solid skins 25a, 25b. In the illustrated embodiment, the upper solid skin 25a is convex, and the lower solid skin 25b is convex or substantially planar. In alternative embodiments, the lower solid skin 25b may be convex, and the upper solid skin 25a may be convex or substantially planar.

The foam junctions 24a, 24b comprise at least one primary foam junction 24a. Each primary foam junction 24a comprises an annular foam joint 32 having outer and inner peripheral edges 34, 36. The foam joint 32 comprises the opposed upper and lower unfoamed solid skins 25a, 25b of the thermoplastic polymer on opposite sides of the central cellular foam core 28 of the thermoplastic polymer. A plurality of the ends 26a, of respective foam ribs 22 intersect with the outer peripheral edge 36 of the foam joint 32. The inner peripheral edge 34 of the foam joint 32 circumferentially surrounds a central area 42 of unfoamed thermoplastic polymer which is significantly thinner than the foamed thermoplastic polymer in the foam ribs 22 and the foam junctions 24a, 24b.

In the preferred embodiment, as illustrated the base 12 comprises a primary foam junction 24a at a centre C of the base 12.

The base 12 preferably comprises an injection moulding sprue 44 which comprises unfoamed thermoplastic polymer and is circumferentially surrounded by a region 46 of unfoamed thermoplastic polymer adjacent thereto. In the illustrated embodiment this is provided by the central area 42 of unfoamed thermoplastic polymer in the primary foam junction 24a. The injection moulding sprue 44 may be located at the outer surface 13 or inner surface 15 of the base 12.

Preferably, the primary foam junction 24a at the centre C of the base 12 is aligned with the injection moulding sprue 44 in the base 12.

Additionally, as illustrated, the foam junctions 24a, 24b comprise at least one second foam junction 24b. Each second foam junction 24b comprises a plurality of the ends 26a of respective foam ribs 22, wherein the ends 26a intersect and surround a central region 48 of unfoamed thermoplastic polymer which is significantly thinner than the foamed thermoplastic polymer in the foam ribs 22 and the foam junctions 24a, 24b. In the preferred embodiment, as illustrated the base 12 comprises a plurality of the second foam junctions 24b which surround, and are spaced from, the centre C of the base 12.

In alternative embodiments, only primary foam junctions 24a or only second foam junctions 24b are provided. Any combination of primary and second foam junctions 24a, 24b may be provided.

The lattice structure 20 is polygonal and the lateral spacings 38 between the ribs 22 are polygonal. Typically, as illustrated, the lattice structure 20 is rectangular and the lateral spacings 38 between the ribs 22 are rectangular, for example when surrounded only by four ribs 22, or triangular, or example when surrounded by two ribs 22 and a portion of the annular peripheral edge 14 of the base 12.

In a first preferred embodiment of the present invention as shown in FIGS. 1 to 8, the base 12 further comprise a base wall 50 of unfoamed thermoplastic polymer which fills the lateral spacings 38 between the ribs 22 and is integral with the lattice structure 20 to form a continuous base surface 52 of the tray 2. The base wall 50 is significantly thinner than the foamed thermoplastic polymer in the foam ribs 22 and the foam junctions 24a, 24b. The lattice structure 20 therefore comprises a closed framework 54 in which parts of the base wall 50 fill the lateral spacings 38 between the ribs 22 and between the ribs 22 and the annular peripheral edge 14 of the base 12. In the illustrated embodiment, a lower surface 56 of the base wall 50 is aligned with a lower surface 58 of the lower unfoamed solid skins 25b of the foam ribs 22 and foam junctions 24a, 24b.

In some embodiments, the annular peripheral edge 14 of the base 12 consists of unfoamed thermoplastic polymer, which is significantly thinner than the foamed thermoplastic polymer in the foam ribs 22 and the foam junctions 24a, 24b. Alternatively, the annular peripheral edge 14 of the base 12 may consist of foamed thermoplastic polymer, which foam is produced at the same time and in the same manner as producing the foam ribs 22 and foam junctions 24a, 24b.

The annular sidewall 4 may consist of unfoamed thermoplastic polymer, which is significantly thinner than the foamed thermoplastic polymer in the foam ribs 22 and the foam junctions 24a, 24b. Alternatively, the annular sidewall 4 may comprise at least one annular foam hoop reinforcement integral with the annular sidewall 4. The foam hoop reinforcement comprises, like the foam ribs, the opposed unfoamed solid skins of the thermoplastic polymer on opposite sides of on opposite sides of a central cellular foam core of the thermoplastic polymer.

In some embodiments, the upper annular peripheral rim 10 consists of unfoamed thermoplastic polymer. Alternatively, the upper annular peripheral rim 10 comprises an annular flange 62 of unfoamed thermoplastic polymer reinforced by an integral annular foam hoop reinforcement. The foam hoop reinforcement comprises opposed unfoamed solid skins of the thermoplastic polymer on opposite sides of a central cellular foam core of the thermoplastic polymer.

The method of the present invention to make the tray 2 of FIGS. 1 to 4 will now be described with reference to FIGS. 5 to 8.

Figure 7:
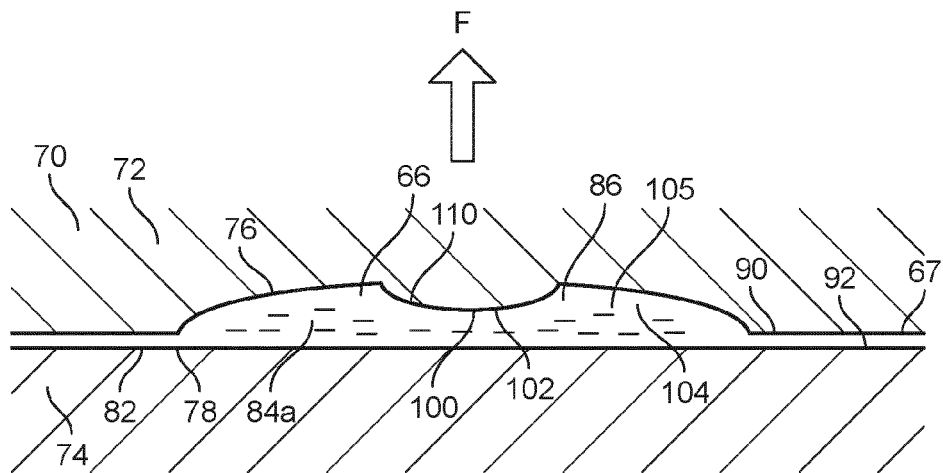
FIG. 7 is an enlarged view of area B of FIG. 6 illustrating in cross-section the structure of a foam rib-forming part in an unfoamed base wall of the intermediate article of FIG. 5, and showing the intermediate article in an injection mould cavity between opposed mould parts.
Figure 8:
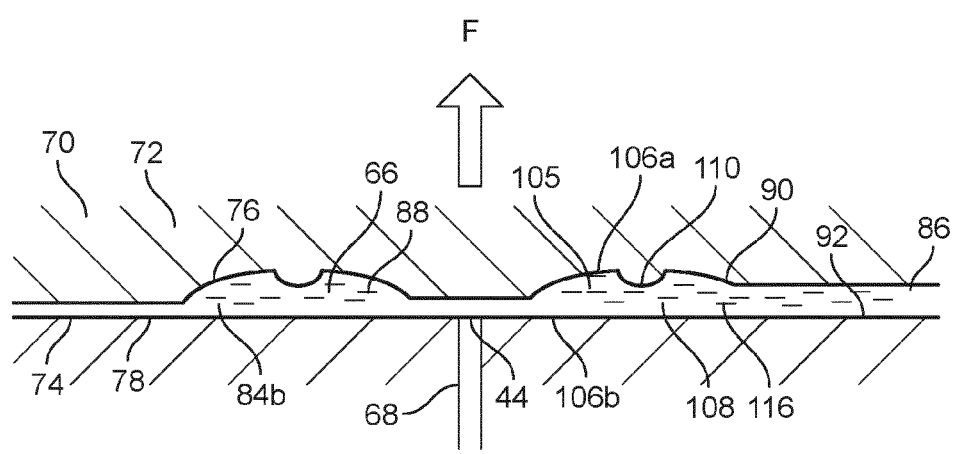
FIG. 8 is an enlarged view, similar to FIG. 7, illustrating in cross-section the structure of a foam junction-forming part, intersected by a foam rib-forming part, in an unfoamed base wall of the intermediate article of FIG. 5, and showing the intermediate article in an injection mould cavity between opposed mould parts and the injection moulding gate of the injection mould.
Figure 9:
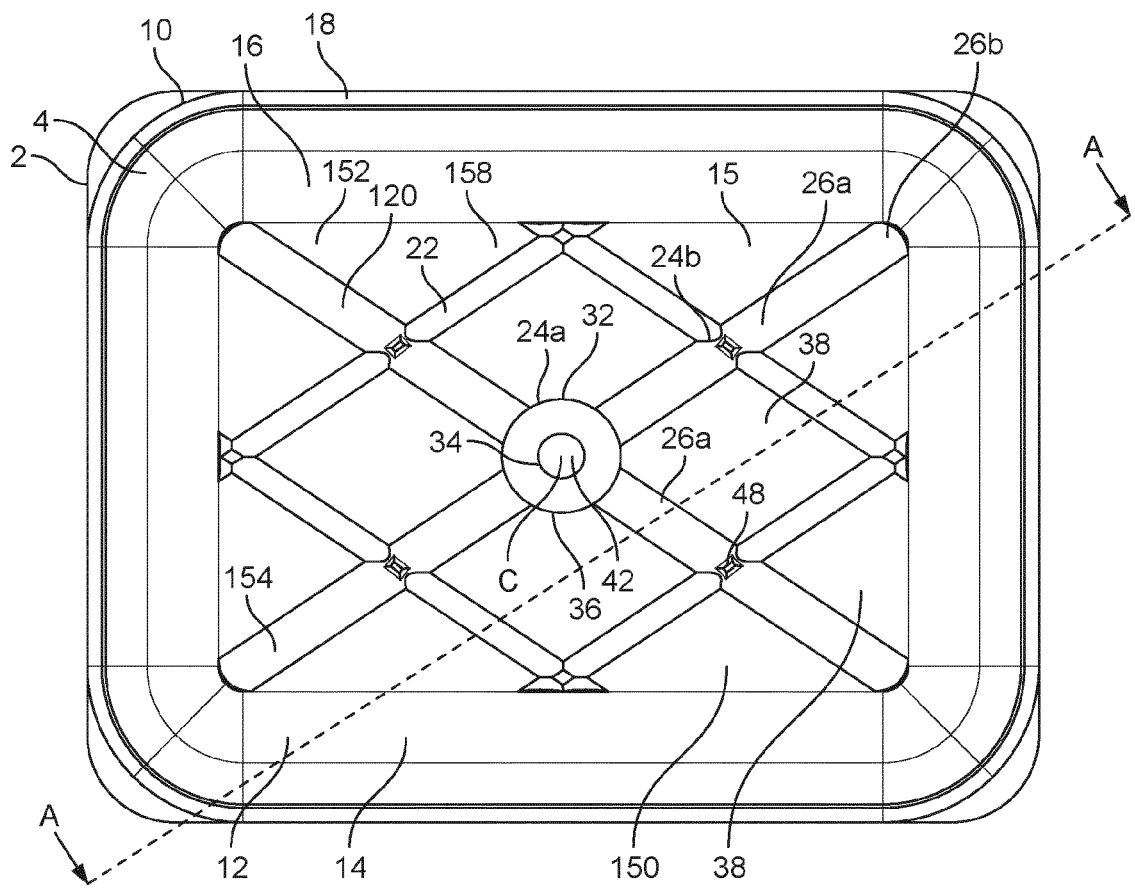
FIG. 9 is a plan view from above of a tray in accordance with a second embodiment of the present invention.
Figure 10:
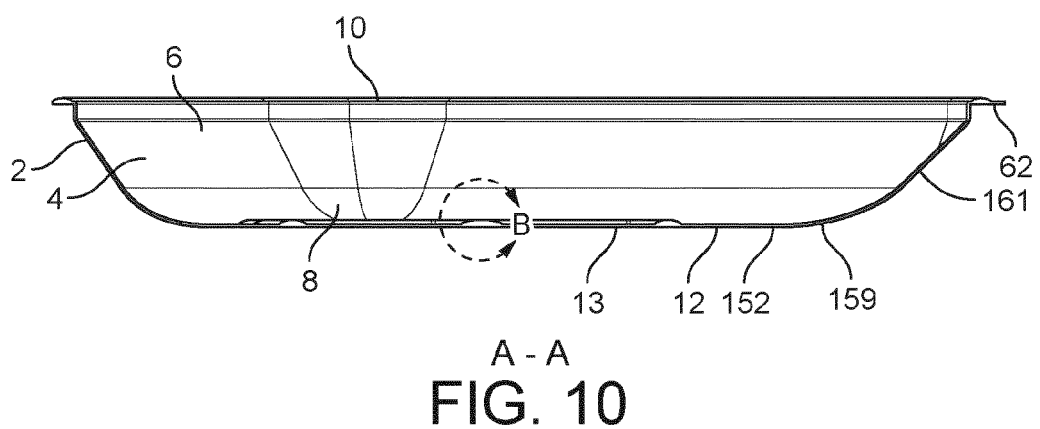
FIG. 10 is a cross-section on line A-A of the tray of FIG. 9.
Figure 11:
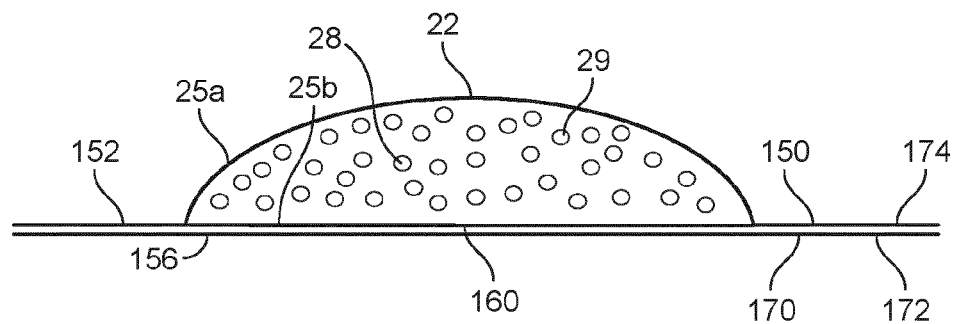
FIG. 11 is an enlarged view of area B of FIG. 10 illustrating in cross-section the structure of a foam rib and an in-mould label in the form of a flexible sheet of the tray of FIG. 9.
Figure 12:
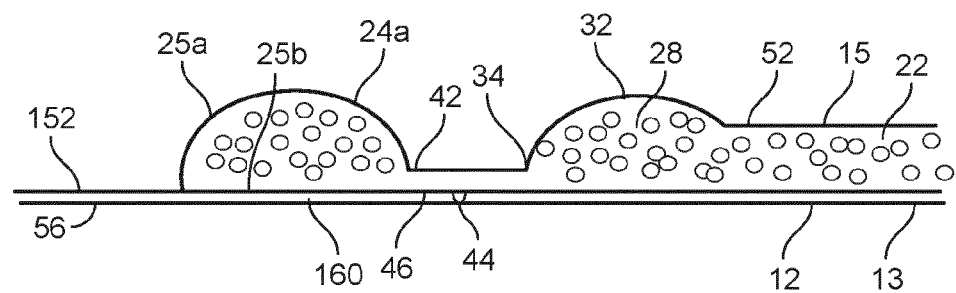
FIG. 12 is an enlarged view, similar to FIG. 11, illustrating in cross-section the structure of a foam junction, intersected by a foam rib, and an in-mould label in the form of a flexible sheet of the tray of FIG. 9.
Figure 13:
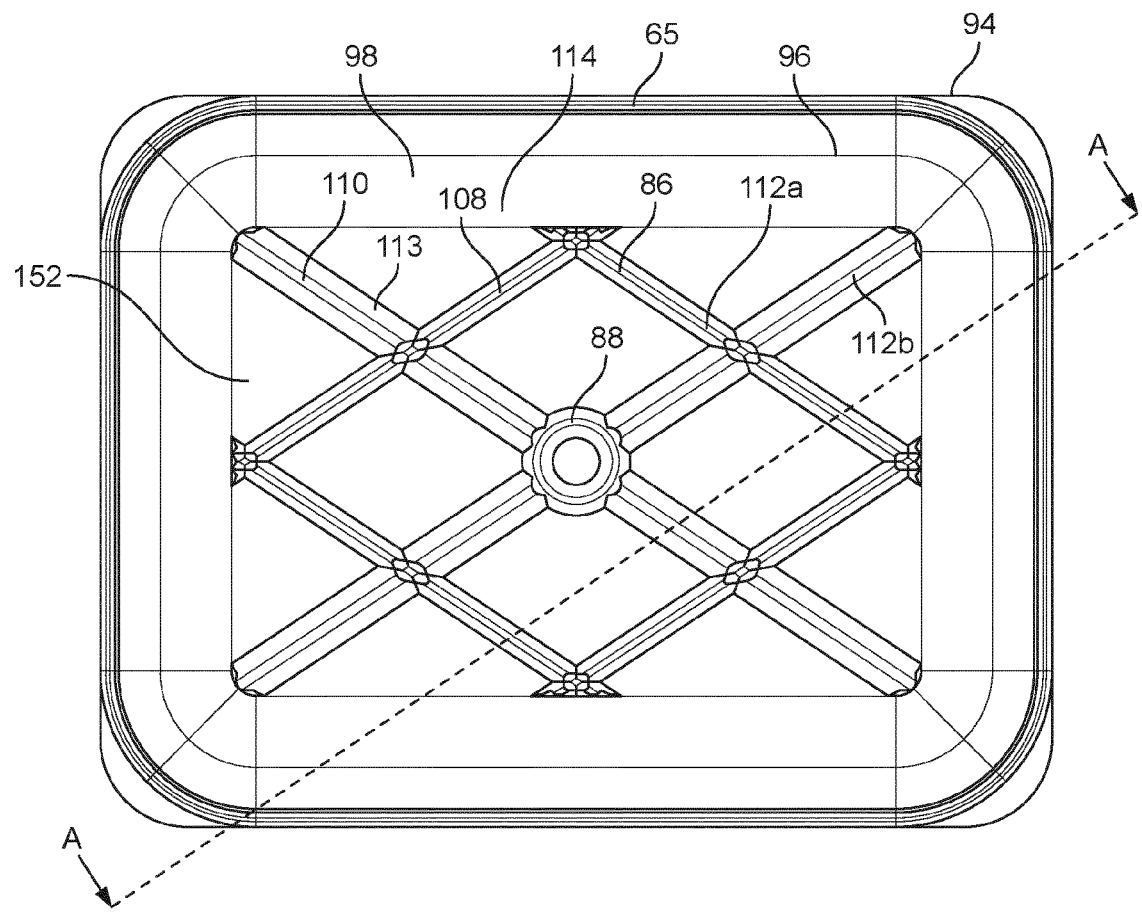
FIG. 13 is a plan view from above of an intermediate article, formed by injection moulding in a mould cavity between mould parts, prior to forming any foam ribs or foam junctions, during manufacture of the tray of FIG. 9.
Figure 14:
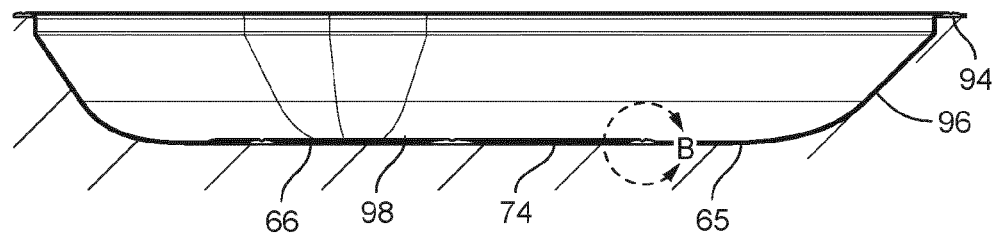
FIG. 14 is a cross-section on line A-A of the intermediate article of FIG. 13.
Figure 15:
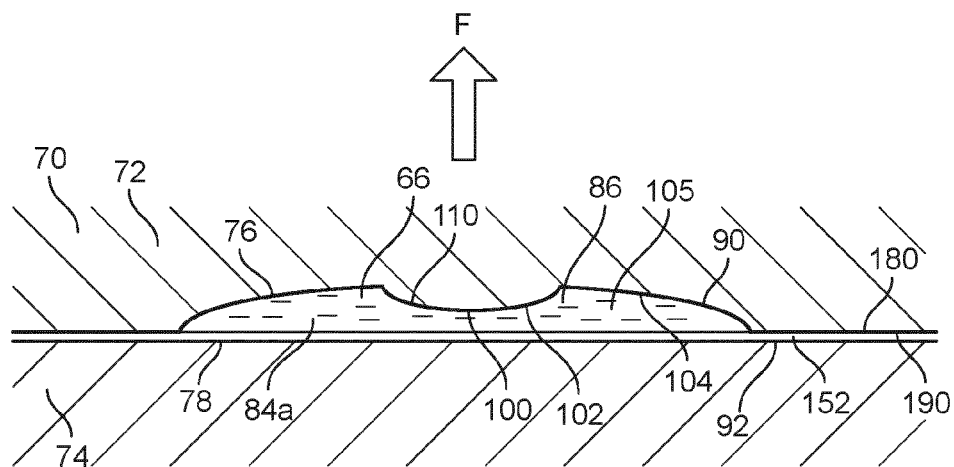
FIG. 15 is an enlarged view of area B of FIG. 14 illustrating in cross-section the structure of a foam rib-forming part, and an in-mould label in the form of a flexible sheet, of the intermediate article of FIG. 13, and showing the intermediate article in an injection mould cavity between opposed mould parts.
Figure 16:
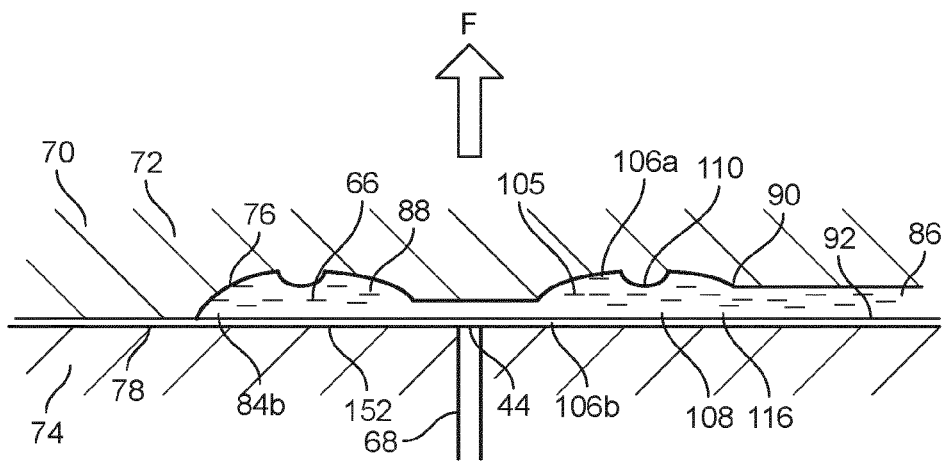
FIG. 16 is an enlarged view, similar to FIG. 15, illustrating in cross-section the structure of a foam junction-forming part, intersected by a foam rib-forming part, and an in-mould label in the form of a flexible sheet, of the intermediate article of FIG. 13, and showing the intermediate article in an injection mould cavity between opposed mould parts and the injection moulding gate of the injection mould.

Referring in particular to FIGS. 7 and 8, the tray 2 is formed using a mould 70 having a first, inner, mould part 72 and a second, outer, mould part 74 for respectively moulding inner and outer surfaces of the tray 2. The first and second mould parts 72, 74 have respective first and second cavity-forming surfaces 76, 78 defining a mould cavity 66 therebetween. The mould 70 has an injection moulding gate 68, located in the second mould part 74 at a geometric centre of the mould 70 and aligned with the centre C of the base 12 of the resultant tray 2, through which a molten plastic composition is injected into the mould cavity 66. The injection moulding gate 68 may alternatively be located in the first mould part 72 and/or at any position relative the tray 2 to be manufactured.

The mould 70 is closed as shown in FIGS. 7 and 8 thereby defining the mould cavity 66 connected to the gate 68. The mould cavity 70 is shaped and dimensioned to mould an intermediate article 65 as shown in FIGS. 5 to 8.

The first and second cavity-forming surfaces 76, 78 define first portions of the mould cavity 66 which are to mould those areas in the tray 2 that are to comprise unfoamed thermoplastic polymer throughout the entire wall thickness, such as the base wall 50 and all of, or areas of, the sidewall 4 and rim 10 that are to be formed of unfoamed thermoplastic polymer, as described above. These first portions are defined between the first and second cavity-forming surfaces 76, 78 which are spaced to define the final wall thickness, and the final shape and configuration, of the areas of the tray 2 that are to be formed of unfoamed thermoplastic polymer throughout the entire wall thickness.

A first portion 82 of the mould cavity 66 to mould the base wall 50, which is consequently part of the intermediate article 65, is shown in FIGS. 7 and 8.

The first and second cavity-forming surfaces 76, 78 define second portions of the mould cavity 66 which are to mould those areas in the tray 2 that are to comprise a core of foamed thermoplastic polymer between opposed solid skins of foamed thermoplastic polymer, such as the foam ribs 22 the foam junctions 24a, 24b that are to comprise a core of foamed thermoplastic polymer, as described above. These second portions are defined between the first and second cavity-forming surfaces 76, 78 which are spaced to define the wall thickness of the intermediate article 65, but not the final wall thickness, final shape or final configuration, of the areas of the tray 2 that are to comprise a core of foamed thermoplastic polymer.

A second portion 84a of the mould cavity 66 to mould a foam rib-forming part 86 is shown in FIG. 7 and a second portion 84b of the mould cavity 66 to mould a foam junction-forming part 88 is shown in FIG. 8.

As shown in FIGS. 7 and 8, the first and second cavity-forming surfaces 76, 78 have respective first and second regions 90, 92 for moulding the base 12 of the tray 2.

Figure 5:
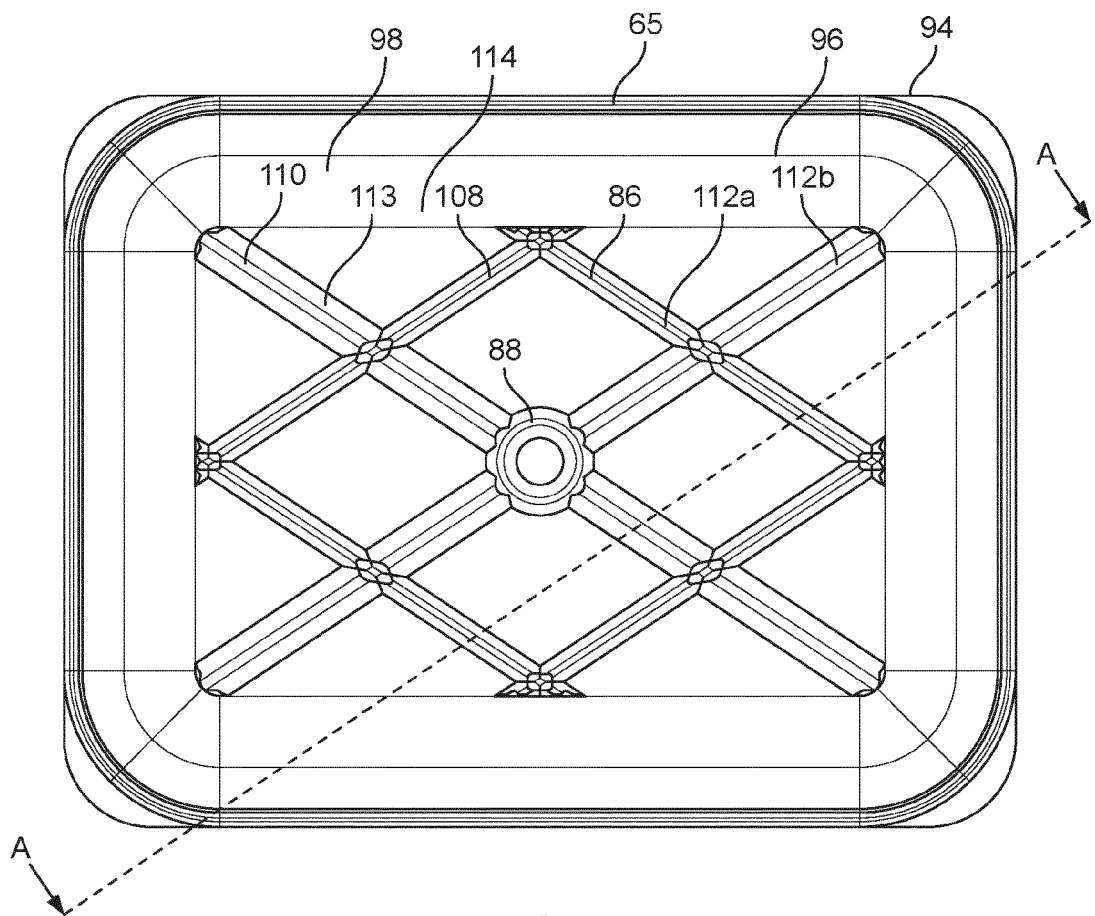
FIG. 5 is a plan view from above of an intermediate article, formed by injection moulding in a mould cavity between mould parts, prior to forming any foam ribs or foam junctions, during manufacture of the tray of FIG. 1.
Figure 6:
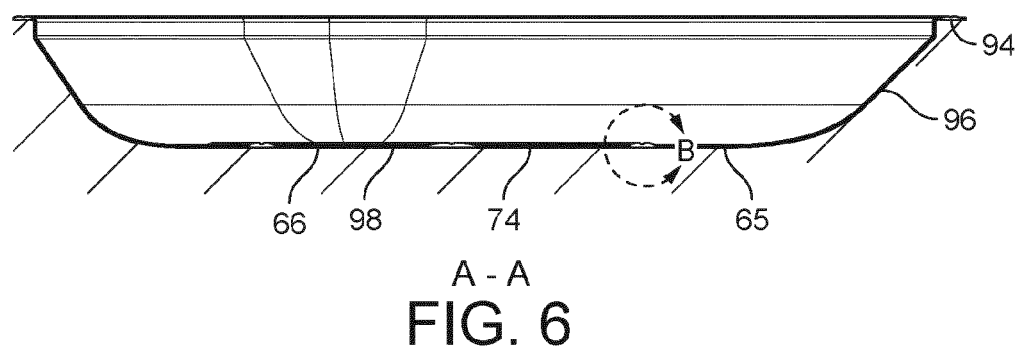
FIG. 6 is a cross-section on line A-A of the intermediate article of FIG. 5.

As schematically indicated in FIGS. 5 and 6, and FIG. 6 also shows the second, outer, mould 74, the mould cavity 66 defines an annular peripheral rim-forming portion 94, an annular sidewall-forming portion 96 which is adjacent to the rim-forming portion 94, and a base-forming portion 98 which is adjacent to the sidewall-forming portion 96. The first region 90 of the first cavity-forming surface 76 comprises a lattice-forming portion 100 comprising a latticed network 102 of concavities 104 in the first cavity-forming surface 76.

A molten plastic composition 105, comprising a thermoplastic polymer and a physical blowing agent, is injected into the cavity 66 through the gate 68 at an injection pressure. The physical blowing agent is a gas dissolved in the polymer.

Blowing agents which can be used in the embodiments of the present invention include physical blowing agents in the form of a gas dissolved in the molten plastic composition. Such a gas may comprise, for example, carbon dioxide. The gas may optionally further include a perfume composition (i.e. a scent) which remains present in the polymer material after expansion, to enhance the consumer experience.

When using carbon dioxide as the blowing agent, $CO_2$ gas is produced by the blowing agent in the extruder of the injection moulding machine, and the $CO_2$ gas then goes into solution during the injection phase (typically from 300 to 500 bar within the mould cavity) due to the relatively high pressure exerted on the material being greater than the pressure required (typically greater than 80 bar) to force $CO_2$ into solution within molten thermoplastic resin, such as polypropylene.

The molten plastic composition is injected at an injection pressure $P_{injection}$. Typically, the injection pressure $P_{injection}$ is at least 150 bar. At the end of the injecting step, optionally a packing pressure, $P_{packing}$, is applied to the cavity. Typically, packing pressure $P_{packing}$ is at least 150 bar.

During the injecting step, and any packing, the injection pressure $P_{injection}$, and any packing pressure $P_{packing}$, respectively, are above a minimum pressure threshold, $P_{threshold}$, in the regions of the cavity 66 to form unfoamed parts of the tray 2, such as the base wall 50. Typically, the minimum pressure threshold $P_{threshold}$ is 80 bar. This prevents the physical blowing agent from coming partly out of solution in the polymer so that cellular gas bubbles are not formed in those region during the injecting step, and any packing step.

During or after the injecting step, the injected plastic composition 105 in contact with the first and second cavity-forming surfaces 76, 78 is cooled to form first and second solid skins 106a, 106b respectively adjacent to and in contact with the first and second cavity-forming surfaces 76, 78. In at least the latticed network 102 of concavities 104 is located a lattice-forming part 108 of the plastic composition 105. In the lattice-forming part 108 at least some of the plastic composition 105 between the first and second solid skins 106a, 106b remains molten.

The lattice-forming part 108 defines a structure of elongate rib-forming parts 86 interconnected by junction-forming parts 88. Each rib-forming part 86 has opposite ends 112a, 112b, and each end 112a, 112b is integrally connected to either an annular outer peripheral edge-forming part 114 of the base-forming part 98 or one of the junction-forming parts 88. Each rib-forming part 86 and each junction-forming part 88 comprise opposed first and second solid skins 106a, 106b on opposite sides of a central core 116 of the molten plastic composition 105.

In the parts of the mould cavity 66 that are to mould unfoamed areas in the tray 2, such as the base wall 50, these unfoamed areas are moulded in the intermediate article 65, which is achieved by the molten plastic composition 105 solidifying to form a solid wall of unexpended thermoplastic polymer throughout its thickness.

The junction-forming parts 88 are configured so that, in the tray 2, the foam junctions comprise at least one primary foam junction 24a and/or second foam junction 24b as described above. The central area 42 and the central region 48 of unfoamed thermoplastic polymer are formed between the first and second cavity-forming surfaces 76, 78 prior to the opening step. The primary foam junction 24a at the centre C of the base 12 is aligned with the injection gate 68 in the injecting step.

In the injecting step, the molten plastic composition 105 is injected through the injection moulding sprue 44 in the base-forming portion 98. The base-forming portion 98 is configured to space the first and second cavity-forming surfaces 76, 78 from each other so that in the tray 2 the injection moulding sprue 44 comprises unfoamed thermoplastic polymer and is circumferentially surrounded by the region 46 of unfoamed thermoplastic polymer adjacent thereto. The first and second cavity-forming surfaces 76, 78 are spaced from each other in the base-forming portion 98 to form a base wall-forming portion 99 of the mould 78, and in the injecting step the solid base wall 50 of unfoamed thermoplastic polymer is formed which fills the lateral spacings 38 between the ribs 22 and is integral with the lattice structure 20 to form the continuous base surface 52 of the tray 2.

After the unfoamed areas in the tray 2 have been formed by solidifying the molten plastic composition 105 in those areas, the mould 70 is opened before the molten plastic composition 105 in the central core 116 between the first and second solid skins 106a, 106b has solidified in the lattice-forming part 108.

The opening of the mould 70 is achieved by removing the first mould part 72 as shown by arrow F in FIGS. 7 and 8 so that the first solid skin 106a is no longer in contact with the first cavity-forming surface 76. In the illustrated embodiment the first and second mould parts 72, 74 are, respectively, outer and inner mould parts which respectively form outer and inner surfaces of the tray 2, and the inner mould part is removed. Alternatively, the first and second mould parts 72, 74 are, respectively, inner and outer mould parts which respectively form inner and outer surfaces of the tray 2, and the outer mould part is removed.

The opening of the mould 70 causes the intermediate article 65 to be transitioned into the final tray 2. In particular, foam-forming parts of the intermediate article 65 are transitioned into foam parts in the tray 2.

Figure 4:
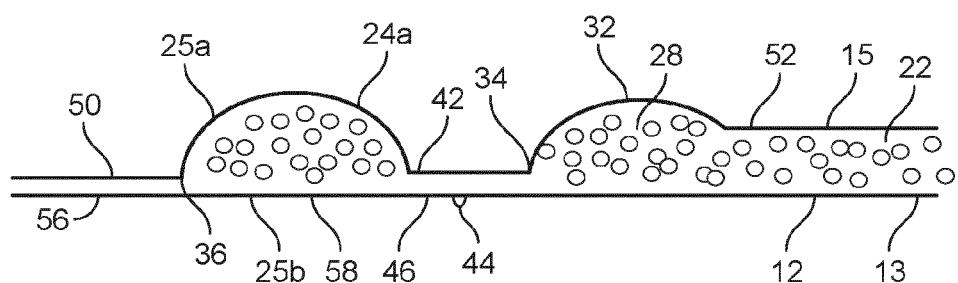
FIG. 4 is an enlarged view, similar to FIG. 3, illustrating in cross-section the structure of a foam junction, intersected by a foam rib, in an unfoamed base wall of the tray of FIG. 1.

The removal of the first mould part 72 exposes the molten plastic composition 105 of the lattice-forming part 108 to an external pressure lower than the injection pressure, for example atmospheric pressure. Such a lowering of pressure allows the molten plastic composition 105 between the first and second solid skins 106a, 106b of the lattice-forming part 108 to expand by foaming to form the expanded cellular foam 29, as shown in FIGS. 3 and 4, as a result of the molten plastic composition 105 beneath the first solid skin 106a expanding away from the second solid skin 106b. The expansion occurs because the blowing agent comes out of solution in the molten plastic composition at the reduced pressure and forms gas bubbles.

During the opening step, at least some of the molten plastic composition 105 in the central core 116 is exposed to an external pressure lower than the minimum pressure threshold, for example atmospheric pressure, to permit the blowing agent to come out of solution and form gas bubbles within the molten plastic composition 105 in the central core 116. This action forms in the tray 2 the expanded cellular foam 29 comprising the core layer 28 of expanded cellular foam 29 between the first and second solid skins 25a, 25b, formed from the plastic composition 105.

The lattice-forming part 108 in the mould cavity 66 has sufficient thickness, and/or the processing time is so short, that the molten polymer resin in the central core 116 does not solidify during the injection step, and any subsequent packing. Also, the lattice-forming part 108 can be additionally heated by an external heater to maintain the plastic composition 105 in the central core 116 in a molten liquid phase. The second mould part 78 may be cooled by a cooling system, for example by a flow of cooling fluid therethrough, to maintain the second mould part 78 at a lower temperature than the first mould part 76. Such temperature control can control the absolute and relative thickness of the central core 116 and the first and second solid skins 106a, 106b, so that as described herein the desired expansion of the central core 116 and deformation and/or stretching of the first solid skin 106a is achieved.

Prior to the opening step, the rib-forming parts 86 and the junction-forming parts 88 comprise opposed first and second solid skins 106a, 106b on opposite sides of the central core 116 of the molten plastic composition 105. During foam expansion, the first solid skin 106a is deformed away from the second solid skin 106b. This deformation may be achieved by stretching the first solid skin 106a so that in the tray 2 the first solid skin 25a is longer than the first solid skin 106a in the intermediate article 65.

In the opening step, in each foam rib 22 the first solid skin 25a is expanded to form a convexly curved surface, and preferably the convexly curved surface is continuously convexly curved between opposite elongate longitudinal edges of the elongate foam rib 22.

As shown in FIGS. 5, 7 and 8, the first solid skin 106a of the rib-forming parts 86 and the junction-forming parts 88 for form the primary foam junctions 24a may be moulded by the first moulding surface 76 to provide a concave recess 110, for example a groove which typically extends along the length of the rib-forming parts 86 and around the circumference of the junction-forming parts 88, centrally located in the moulded surface 112 of the rib-forming parts 86 and the junction-forming parts 88. Accordingly, the first solid skin 106a of the rib-forming parts 86 and the junction-forming parts 88 has a profiled upper moulded surface 113.

When such a profiled upper moulded surface 112 incorporating the concave recess 110 is provided, additionally or alternatively to stretching, the first solid skin 106a of the rib-forming parts 86 and the junction-forming parts 88 is popped outwardly by the expanding gas pressure and the concave recess 110 in the intermediate article 65 is transitioned into a convex surface in the foam ribs 22 and foam junctions 24a in the tray 2.

Typically, after the cooling step, the length of the first solid skin 25a in the tray 2 has stretched, as compared to the first solid skin 106a present prior to the opening step in the intermediate article 65, by a stretch ratio of from 0.5 to up to 3%. The stretch ratio is the ratio of the increase in the length of the first solid skin 25a after the cooling step based on length of the first solid skin 106a before the opening step. For example an increase in length of the first solid skin from an initial value of 100 mm to a final value of 102.5 mm would represent a stretch ratio of 2.5%. Preferably the stretch ratio is from 2 to 3%, more preferably from 2.25 to 2.75%, still more preferably from 2.4 to 2.6%, for example about 2.5%. However, alternatively the first solid skin 25a is not stretched.

For the unexpanded regions to be formed in the tray 2, the mould 70 is shaped and dimensioned so that a narrow region 67 of the cavity 66 is formed between the first and second cavity-forming surfaces 76, 78. During the injecting step, and optional packing, the injection pressure, the optional packing pressure, are maintained above the minimum pressure threshold in the narrow region 67 of the cavity 66 to maintain the physical blowing agent as a gas dissolved in the molten plastic composition 105 so that substantially no gas bubbles are formed in the narrow region 67 of the cavity 66. Prior to the opening step, the plastic composition 105 in the narrow region 67 of the cavity 66 is cooled so as to be fully solidified, to form in the tray 2 at least one the unexpanded region comprising a substantially homogeneous, solid phase, unexpanded thermoplastic polymer.

This narrow region 67 of the mould cavity 66 is thin, and so the molten polymer resin requires a relatively short time period, shorter than the injection step, and the optional packing, to cool and solidify. Also, this narrow region 67 can be additionally cooled by an external cooler to transition the polymer resin from the molten liquid phase into a solid phase. After the opening step, the solid plastic composition cannot expand further by foaming, and cannot form an expanded cellular foam. Therefore the unexpanded region appears transparent to the naked eye.

The opening step comprises removing the first mould part 72 so that the first solid skin 106a is no longer in contact with the first cavity-forming surface 76, while maintaining the second solid skin 106b in contact with the second cavity-forming surface 78. In the illustrated embodiment, this opening is achieved by removing the inner mould part 72, exposing the first solid skin 106a to atmospheric pressure and leaving the second skin 106b on the inner mould part 74.

However any other configuration to open the mould may be used. In particular, in an alternative embodiment at least one or more portions of the outer mould part 74 may be removed from the second solid skin 106b so that the second solid skin 106b, or any part thereof, is additionally or alternatively exposed to atmospheric pressure. In other words, the foam expansion may be oriented towards the inner surface of the tray 2 or towards the outer surface of the tray 2.

Thereafter, the expanded cellular foam 29 is cooled to cause the molten plastic composition 105 between the first and second solid skins 106a, 106b of the lattice-forming part 108 to solidify and to form in the base 12 of the tray 2 the lattice structure 20 of elongate foam ribs 22 interconnected by foam junctions 24a, 24b. The cooling may be carried out passively in the ambient atmosphere, or by active cooling, for example by blowing cool air onto the tray 2.

In the intermediate article 65 the rib-forming parts 86 and the junction-forming parts 88 typically have a thickness of from 0.5 to 1.5 mm, optionally from 0.75 to 1.25 mm. In the tray 2 the expanded foam ribs 22 and foam junctions 24a, 24b typically have a thickness of from 1 to 3 mm, optionally from 1.5 to 2.5 mm. Typically, rib-forming parts 86 and the junction-forming parts 88 have increased in thickness by from 0.5 to 1.5 mm to form the expanded foam ribs 22 and foam junctions 24a, 24b respectively.

The unexpanded regions typically have a thickness of from 0.25 to 0.75 mm, optionally from 0.25 to 0.5 mm.

The expanded foam ribs 22 and foam junctions 24a, 24b typically appear translucent to the naked eye because the expanded cellular foam includes cells that have cellular walls that reflect visible light. However, if a pigment is incorporated into the thermoplastic polymer at a high concentration, the foam ribs 22 and foam junctions 24a, 24b may typically appear opaque, with a solid colour. In contrast, the unexpanded regions has no cells, or if any cells are present, for example at a low concentration, they have a cell size of typically less than 0.5 microns and therefore are not visible to the naked eye, and consequently the unexpanded regions appears transparent to the naked eye. The unexpanded regions appear transparent to the naked eye, since the blowing agent, in this embodiment $CO_2$ gas, has stayed in solution in the polymer, in this embodiment polypropylene, during manufacture of the article. After the molten polymer has solidified, it is not possible for cells to form as a result of any action of the blowing agent.

Referring to FIGS. 9 to 16, there is shown a second preferred embodiment of the present invention. In the second embodiment, there are two essential differences as compared to the first embodiment: (i) instead of the lattice structure of the base being a closed framework with a base wall connecting the ribs and junctions of the lattice to form a continuous base surface of the tray, instead the lattice structure 120 is an open framework 154 with a plurality of openings 150, with each opening 150 being surrounded by a plurality of the elongate foam ribs 22, or by at least one of the elongate foam ribs 22 and a portion of the lower annular peripheral edge 14 of the base 12, and (ii) the base 12 further comprises a flexible sheet 152 which is bonded to an upper or lower surface 156 of the open framework lattice structure 120 and to the annular peripheral edge 14 of the base 12 to cover the openings 150 and form a sealed base surface 158 of the tray, and the flexible sheet 152 can be incorporated as an in-mould label (IML) using IML technology.

Typically, the flexible sheet 152 is composed of an unfoamed thermoplastic polymer comprising a single polymer layer or a multilayer laminate. Alternatively, the flexible sheet 152 is composed of a foamed thermoplastic polymer comprising opposed unfoamed solid skins of the thermoplastic polymer on opposite sides of a central cellular foam core of the thermoplastic polymer. The flexible sheet 152 may alternatively be composed of any suitable sheet material for use in packaging, for example cardboard, metal or metallised plastics material.

In one arrangement, as illustrated, the flexible sheet 152 is bonded to a lower surface 160 of the lattice structure 120 and to a lower surface 162 of the annular peripheral edge 14 of the base 12. The sprue 44 may pass through a hole 168 in the flexible sheet 152 when the sprue 44, and during injection moulding the injection gate 68, and the flexible sheet 152 are on the same side of the tray 2, i.e. on the inner side 15 or the outer side 13 of the base 12 of the tray 2. Alternatively, the sprue 44, and during injection moulding the injection gate 68, may be located on the outer or inner side of the tray 2 and the flexible sheet 152 may be located on the other side of the tray 2.

In another arrangement, the flexible sheet 152 is bonded to an upper surface of the lattice structure and to an upper surface of the annular peripheral edge of the base.

Typically, the flexible sheet 152 is additionally bonded to a surface of the sidewall 4 which surrounds the base 12 of the tray 4.

In the second preferred embodiment, each opening 150 is covered by a respective portion 170 of the flexible sheet 152. Each portion 170 is typically slack and thereby not under tension, which is because the lattice structure 120 tends to shrink upon cooling whereas the flexible sheet 152 tends to exhibit lower shrinkage than the lattice structure 120.

In a preferred tray structure, the flexible sheet 152 has an outer peripheral edge (not shown) which is sealed within the thickness of the sidewall 4 or base 12. Preferably, the outer peripheral edge of the flexible sheet 152 is sealed within a central cellular foam core of the sidewall 4 or base 12. Such a sealing structure means that if the flexible sheet 152 comprises a foam layer, or a recycled polymer layer, the foam or recycled polymer layer is prevented from coming into direct contact with the contents, e.g. foodstuffs, which may be packed within the tray 2.

Preferably, at least one or both of an outer surface 170 and an inner surface 174 of the flexible sheet 152 is printed whereby the sheet 152 functions as a label. The flexible sheet 152 can be applied using an in-mould label (IML) process to provide structure to the tray 2 and the function of a label, providing printed information on either or both of the outer and inner surfaces of the tray 2.

In the second embodiment, the injecting and opening steps are carried out as for the first embodiment.

However, the mould 70 is configured to form the openings 150 and to incorporate an in-mould labelling function to bond the flexible sheet 152 to the open lattice structure 120 of the tray 2.

The method is modified as compared to the method described with respect to the first embodiment by further comprising the step, before the injecting step from an injector nozzle, of providing an in-mould label 190 in the form of the flexible sheet 152 at least partly surrounding the cavity 66. The in-mould label 190 is located adjacent to the second cavity-forming surface 78.

In the mould closing step, the first and second cavity-forming surfaces 76, 78 are compressed together in the base-forming portion 98 to form an opening-forming portion 180 of the mould. Before the injecting step, the in-mould flexible sheet 152 is provided in the cavity 66. The in-mould flexible sheet 152 is located, as illustrated, adjacent to the second cavity-forming surface 78 at a location opposite the lattice-forming portion 100 of the first cavity-forming surface 76. Alternatively, the in-mould flexible sheet 152 may be located adjacent to the lattice-forming portion 100 of the first cavity-forming surface 76.

Thus the in-mould flexible sheet 152 is located in the opening-forming portion 180 of the mould 70 and compressed between the first and second cavity-forming surfaces 76, 78.

During the injecting step, in the regions of the mould cavity 66 to form the openings 150 of the open framework 154 of the lattice structure 120, the flexible film 152 is squeezed between the first and second cavity-forming surfaces 76, 78 so that the molten plastic composition is not injected between the first and second cavity-forming surfaces 76, 78 so that the openings 150 are formed, with the portion 170 of the flexible sheet 152 covering the opening 15. During the injecting step, the flexible sheet 152 is bonded to the first or second solid skin 25a, 25b of the lattice structure 120, and bonded to the annular peripheral edge 14 of the base 12 to cover the openings 150 and form a sealed base surface 158 of the tray 2.

Prior to the mould closing step, the in-mould flexible sheet 152 may be located adjacent to the outer mould part 74 of the first and second mould parts 72, 74 which forms an outer surface 13 of the tray 2. In the resultant tray 2, the flexible sheet 152 is bonded to the lower surface 156 of the lattice structure 120 and to the lower surface 159 of the annular peripheral edge 14 of the base 12 of the tray 2. The flexible sheet 152 may be additionally bonded to an outer peripheral surface 161 of the sidewall 4 which surrounds the base 12 of the tray 2.

In an alternative embodiment, prior to the closing step the in-mould flexible sheet 152 may be located adjacent to the inner mould part 72 of the first and second mould parts 72, 74 which forms an inner surface 15 of the tray 2. The flexible sheet 152 is bonded to an upper surface of the lattice structure 120 and to an upper surface of the annular peripheral edge 14 of the base 12 of the tray 2.

As described above, the flexible sheet 152 has an outer peripheral edge which may be sealed within the thickness of the sidewall 4 or base 12.

In some embodiments of the present invention, the mechanical properties and dimensions of the in-mould label 190 can be selected to control the stretch ratio of the solid skin of the tray 2 to which the in-mould label 190 is bonded. In this way, the in-mould label 190 can function to control the shape, dimensions and properties of the tray 2.

During the expansion of the first solid skin 106a to form first solid skin 25a in the tray 2, the second solid skin 106b may remain fully in contact with the second cavity-forming surface 78 with the result that the shape and configuration of the second solid skin 25b in the tray 2 corresponds to the shape and configuration of the second cavity-forming surface 78. This shaping of a planar second skin 25b is shown in FIGS. 3 and 4, and in FIGS. 11 and 12. However, in many embodiments the expansion force from the blowing agent causes the second solid skin 106b in the foam ribs 22 and foam junctions 24a, 24b to be urged away from the second cavity-forming surface 78, in particular at the edges of the foam ribs 22 and foam junctions 24a, 24b.

Figure 17:
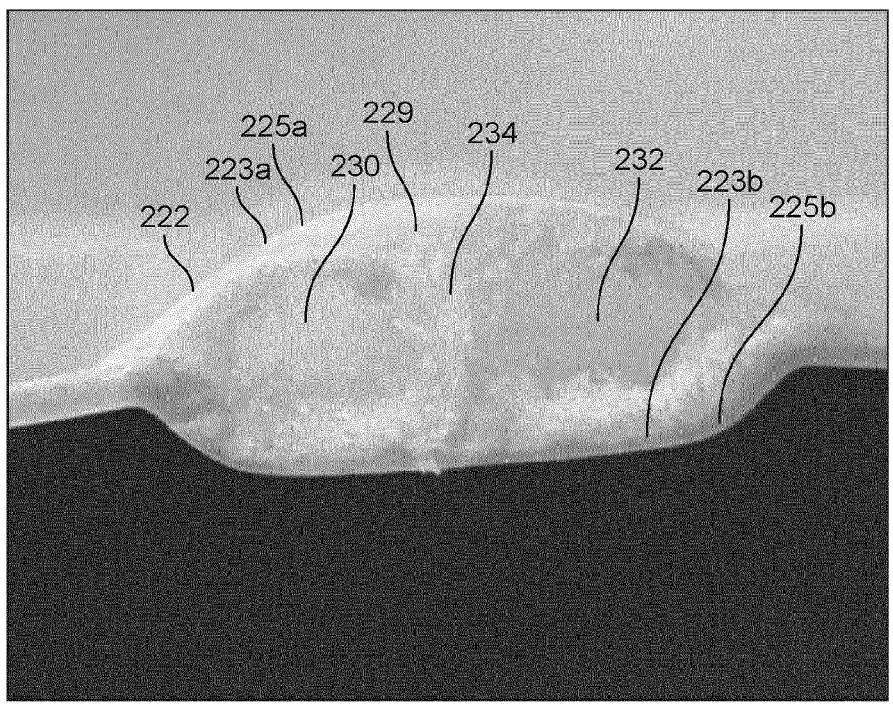
FIG. 17 is an enlarged view illustrating in cross-section the structure of a foam rib in accordance with a further embodiment of the present invention, which structure may alternatively be present in either or both of the first and second embodiments.

Therefore, although the surface of the foam ribs 22 and junctions 24a, 24b formed on the second mould side are illustrated as being planar in FIGS. 3 and 4, and FIGS. 11 and 12, corresponding to the second cavity-forming surface 78, in practice the surface of the second skin 25b tends to exhibit some convexity as a result of the edges of the surface being urged away from the mould surface under the action of the expansion force from the blowing agent. FIG. 17 shown an embodiment in which both opposed surfaces of the rib 222 are convex. In FIG. 17, the upper surface 223a comprises the first solid skin 225a and the lower surface 223b comprises the second solid skin 225b.

Moreover, although the expanded cellular foam 29 shown in FIGS. 3 and 4, and FIGS. 11 and 12, has a continuous composition throughout the cross-section of the rib 22 and junctions 24a, 24b, in many embodiments the expansion force from the blowing agent causes at least one enlarged central cavity to be formed within the rib 22 and junctions 24a, 24b. Such a morphology is shown in FIG. 17. It may be seen in FIG. 17 that the rib 222 has two central cavities 230, 232 separated by a central web 234. The two central cavities 230, 232 are surrounded by a layer of expanded cellular foam 229 and the central web 234 is composed of the expanded cellular foam 229. The two central cavities 230, 232 are formed on opposite sides of the concave recess 110, for example the groove, which extends along the length of the rib-forming part 86. The expanded cellular foam 229 therefore has a cross-section similar in shape to a figure-of-8. It is believed that any enlarged cavity formed in the foam rib or foam junction is a result of expanded cells coalescing during the expansion or cooling processes while the thermoplastic polymer is still flowable at an elevated temperature and the blowing agent exerts an expansion pressure on the thermoplastic polymer. The presence of a hollow rib or hollow junction can increase the mechanical properties of the rib or junction while minimizing material weight.

In the preferred embodiments of the present invention, the tray may be designed or configured to package foodstuffs, but the tray may be used for any purpose. The tray may have heat resistance and may be suitable for warming foodstuff in an oven or microwave oven. The tray may be disposable or reusable, and in either case is recyclable since the tray is preferably composed of a single polymer, for example polypropylene.

Various modifications to the illustrated embodiments will be apparent to those skilled in the art and are intended to be included within the scope of the present invention as defined by the appended claims.

The invention claimed is:

1. A tray comprising: an annular sidewall having upper and lower annular peripheral edges, an upper annular peripheral rim which is integral with the upper annular peripheral edge, and a base which comprises an annular peripheral edge which is integral with the lower annular peripheral edge of the sidewall, wherein the rim, the sidewall and the base are composed of a thermoplastic polymer and the sidewall and the base define a central concavity for packaging a product, wherein the base comprises a lattice structure of elongate foam ribs interconnected by foam junctions, wherein each foam rib has opposite ends, and each end is integrally connected to either the annular peripheral edge of the base or one of the foam junctions, wherein each foam rib and each foam junction comprise opposed upper and lower unfoamed solid skins of the thermoplastic polymer on opposite sides of a central cellular foam core of the thermoplastic polymer, wherein the lattice structure is an open framework with a plurality of openings, each opening being surrounded by a plurality of the elongate foam ribs, or by at least one of the elongate foam ribs and a portion of the lower annular peripheral edge, and wherein the base further comprises a flexible sheet which is bonded to the lattice structure and to the annular peripheral edge of the base to cover the openings and form a sealed base surface of the tray.

2. The tray of claim 1 wherein the foam junctions comprise at least one primary foam junction, wherein each primary foam junction comprises an annular foam joint having outer and inner peripheral edges, wherein the foam joint comprises opposed upper and lower unfoamed solid skins of the thermoplastic polymer on opposite sides of a central cellular foam core of the thermoplastic polymer, a plurality of the ends of respective foam ribs intersect with the outer peripheral edge of the foam joint, and the inner peripheral edge of the foam joint circumferentially surrounds a central area of unfoamed thermoplastic polymer.

3. The tray of claim 2 wherein the base comprises a primary foam junction at a centre of the base, optionally wherein the primary foam junction at the centre of the base is aligned with an injection moulding sprue in the base.

4. The tray of claim 1 wherein the foam junctions comprise at least one second foam junction, wherein each second foam junction comprises a plurality of the ends of respective foam ribs, wherein the ends intersect and surround a central region of unfoamed thermoplastic polymer.

5. The tray of claim 4 wherein the base comprises a plurality of the second foam junctions which surround, and are spaced from, a centre of the base.

6. The tray of claim 1 wherein the base comprises an injection moulding sprue which comprises unfoamed thermoplastic polymer and is circumferentially surrounded by a region of unfoamed thermoplastic polymer adjacent thereto.

7. The tray of claim 1 wherein the lattice structure is polygonal and lateral spacings between the ribs are polygonal, optionally wherein the lattice structure is rectangular and the lateral spacings between the ribs are rectangular or triangular.

8. The tray of claim 1 wherein the flexible sheet is bonded to a lower surface of the lattice structure and to a lower surface of the annular peripheral edge of the base.

9. The tray of claim 8 wherein the flexible sheet is additionally bonded to an outer peripheral surface of the sidewall which surrounds the base of the tray.

10. The tray of claim 9 wherein the flexible sheet is bonded to an upper surface of the lattice structure and to an upper surface of the annular peripheral edge of the base.

11. The tray of claim 1 wherein each opening is covered by a respective portion of the flexible sheet, each portion being slack and thereby not under tension.

12. The tray of claim 1 wherein the flexible sheet has an outer peripheral edge which is sealed within the thickness of the sidewall or base.

13. The tray of claim 12 wherein the outer peripheral edge of the flexible sheet is sealed within a central cellular foam core of the sidewall or base.

14. The tray of claim 1 wherein the flexible sheet is composed of an unfoamed thermoplastic polymer comprising a single polymer layer or a multilayer laminate, or the sheet is composed of a foamed thermoplastic polymer comprising opposed unfoamed solid skins of the thermoplastic polymer on opposite sides of a central cellular foam core of the thermoplastic polymer.

15. The tray of claim 1 wherein at least one or both of an outer surface and an inner surface of the sheet is printed whereby the sheet functions as a label.

16. The tray of claim 1 wherein the base further comprises a base wall of unfoamed thermoplastic polymer which fills lateral spacings between the ribs and is integral with the lattice structure to form a continuous base surface of the tray.

17. The tray of claim 16 wherein an upper surface of the base wall is aligned with an upper surface of the upper unfoamed solid skins of the foam ribs and foam junctions.

18. The tray of claim 1 wherein in each foam rib one or both of the opposed upper and lower unfoamed solid skins of the thermoplastic polymer comprises a convexly curved surface.

19. The tray of claim 18 wherein the convexly curved surface is continuously convexly curved between opposite elongate longitudinal edges of the elongate foam rib.

20. The tray of claim 1 wherein the annular peripheral edge of the base consists of unfoamed thermoplastic polymer.

21. The tray of claim 1 wherein the annular sidewall consists of unfoamed thermoplastic polymer.

22. The tray of claim 1 wherein the upper annular peripheral rim consists of unfoamed thermoplastic polymer.

* * * * *